Patented June 17, 1952

2,600,378

UNITED STATES PATENT OFFICE 2,600,378

PREPARATION OF TETRAETHYL PYROPHOSPHATE

Joseph B. Dickey, Rochester, N. Y., and Harry W. Coover, Jr., Kingsport, Tenn., assignors to Eastman Kodak Company, Rochester, N. Y., a corporation of New Jersey No Drawing. Application April 14, 1950, Serial No. 156,048

4 Claims. (Cl. 260—461)

This application relates to a process for preparing organic phosphorus compounds which are particularly useful for insecticidal purposes by means of a trialkyl phosphate and a lower fatty acid anhydride.

We have discovered that trialkyl phosphates, particularly triethyl phosphate, react with lower fatty acid anhydrides, such as of acetic, propionic, or butyric to give complex, organic phosphorus compounds having insecticidal properties. The other product of this reaction is the alkyl ester of the acid anhydride used. Ordinarily the trialkyl phosphate and the acid anhydride are reacted in the proportion of one mol. of the phosphate with ½-1 mol. of the anhydride. We have found that the reaction is facilitated by the presence of a catalyst. When one mol. of triethyl phosphate is reacted with ½ mol. of acetic anhydride, there is obtained one mol. of ethyl acetate plus an organic phosphorus compound containing one less ethyl group per phosphorous molecule. The resulting product appears to be mainly tetraethyl pyrophosphate. If the reaction product thus formed is reacted with more acetic anhydride either due to its presence originally or to its addition after the above-described reaction has taken place, still more ethyl acetate is formed and the reaction product contains still less ethyl groups per phosphorous molecule. The reaction product here appears to be a higher molecular weight polyphosphonate, the molecular weight of this polyphosphonate depending upon how much acetic anhydride is reacted with the triethyl phosphate. The reaction is carried out preferably at a temperature within the range of 140–205° C. and in the presence of a catalyst. Some of the catalysts which have been found to be particularly useful in the reaction of this type are boron trifluoride etherate, sulfuric acid, boric anhydride, boric acid, or esters of boric acid, such as butyl borate.

In the operation of the process in accordance with our invention it is ordinarily desirable to distil the alkyl acetate from the reaction mixture as rapidly as it is formed, thus driving the reaction to the right, this being accomplished, for instance, by attaching a distillation column packed with Pyrex chips to the closed reaction vessel in which the reaction is carried out.

The products prepared in accordance with our invention have been tested for insecticidal properties by determining the percentage of kill of fruit flies. These products have been mixed with inert powder, such as sulfur, in proportions of 1:100, 1:500, 1:1000, and 1:2000. It has been found that the kill of fruit flies has been 100% with these compositions in a time of but 4 or 5 minutes. The time required for the reaction in our process depends upon the catalyst used, the amount of catalyst, and the reaction temperature employed. The following table has been collected from the results of several instances of processes in accordance with our invention in which two mols. of triethyl phosphate and one mol. of acetic anhydride were added together in a flask with the specified catalyst and the reaction mixture was heated until two mols. of ethyl acetate formed were collected.

| Catalyst Used | Reaction Temperature | Duration of Reaction |
|---|---|---|
| | °C. | hours |
| 0.5 cc. $BF_3 \cdot Et_2O$ | 170–205 | 2 |
| 1.0 cc. $BF_3 \cdot Et_2O$ | 165–170 | 5 |
| 1.0 cc. $BF_3 \cdot Et_2O$ | 145–150 | 9½ |
| 3.5 cc. $BF_3 \cdot Et_2O$ | 160–170 | 1¾ |
| 3.5 cc. $BF_3 \cdot Et_2O$ | 165–172 | 1½ |
| 20.0 cc. $BF_3 \cdot Et_2O$ | 160–170 | 1 |
| 1 cc. $H_2SO_4$ | 165–170 | 12 |
| 3.5 cc. $H_2SO_4$ | 160–170 | 6 |
| 5 cc. $H_2SO_4$ | 160–170 | 5 |

The reaction product in all cases was a dark brown liquid containing 20–30% of unreacted triethyl phosphate. The latter could be removed by distillation at a low temperature under a high vacuum although the presence of this material therein was not detrimental to the use of the material for insecticidal purposes. Toxicity tests on the samples indicated that it was desirable to carry out the reaction as rapidly as possible to obtain the highest toxicity. The product prepared by the method described ordinarily contained 27–40% of tetraethyl pyrophosphate and for insecticidal purposes the product was used in the unrefined condition.

The following examples illustrate our invention:

*Example 1.*—One mol. of triethyl phosphate, 0.5 mols. of acetic anhydride and a trace of boron trifluoride etherate was mixed together and placed in a distillation flask. The reaction mixture was heated on an oil bath at 175–180° C. for three hours. At the end of this time one mol. of ethyl acetate had distilled from the reaction mixture. The product remaining was a clear, slightly viscous liquid.

*Example 2.*—One mol. of trimethyl phosphate was mixed with one half mol. of acetic anhydride and a trace of concentrated sulfuric acid and the mixture was placed in a distillation flask. The reaction mass was heated in an oil bath at 175–180° C. for 4½ hours. At the end of this time 1 mol. of methyl acetate had distilled from the reaction mixture. The reaction product was a light brown viscous liquid.

*Example 3.*—One mol. of tripropyl phosphate was mixed with 0.5 mol. of propionic anhydride and a trace of sulfuric acid and the mixture was placed in a distillation flask. The mass was heated at a temperature of 180–185° C. for twelve hours. At the end of this time one mol. of propylpropionate had distilled from the reaction mixture. The remaining product was a clear viscous liquid.

Other alkyl phosphates may be employed in procedures similar to those described in the examples to prepare other organic phosphorus compounds. Some alkyl phosphates which may be used in this connection are:

Tri-β chloroethyl phosphate
Tri-β,β difluoroethyl phosphate
Tri-β cyanoethyl phosphate
Tri-β fluorethyl phosphate
Tri butyl phosphate
Diethyl phenyl phosphate
Tri-β methoxyethyl phosphate In reactions in accordance with our invention the amount of catalyst needed is extremely small such as on the order of 0.001–0.6% of the boron compound or the sulfuric acid based on the weight of the mixture of triethyl phosphate and acetic anhydride although in some cases as much catalyst as 5.0% may be employed. The reaction will even progress in the absence of catalyst. However, we have found that ordinarily the best results are obtained when the reaction is speeded up and, hence, the use of catalyst is preferred.

We claim:

1. A process of preparing insecticidal organic phosphorus compounds which comprises heating together triethyl phosphate and acetic anhydride in the presence of 0.001–0.6% of boron trifluoride etherate at a temperature within the range of 140–205° C.

2. A process of preparing insecticidal organic phosphorus compounds, which comprises heating together a triethyl phosphate and acetic anhydride together with 0.001–0.6% of a catalyst selected from the group consisting of boron trifluoride etherate, sulfuric acid, boric anhydride, boric acid, and butyl borate at a temperature within the range of 140–205° C.

3. A process of preparing insecticidal organic phosphorus compounds which comprises heating together a trialkyl phosphate, the alkyl being of 2–4 carbon atoms and acetic anhydride together with 0.001–0.6% of a catalyst selected from the group consisting of boron trifluoride etherate, sulfuric acid, boric anhydride, boric acid and butyl borate, at a temperature within the range of 140–205° C.

4. A process of preparing insecticidal organic phosphoric compounds which comprises heating together trialkyl phosphate and acetic anhydride in the presence of 0.001–0.6% of boron trifluoride etherate at a temperature within the range of 140–205° C.

JOSEPH B. DICKEY.
HARRY W. COOVER, Jr.

REFERENCES CITED

The following references are of record in the file of this patent:

UNITED STATES PATENTS

| Number | Name | Date |
|---|---|---|
| 2,495,220 | Bell | Jan. 24, 1950 |

OTHER REFERENCES

Whitmore, Organic Chemistry, (1937), page 500.